Oct. 6, 1964  L. R. JACKSON  3,151,712
INSULATING STRUCTURE
Filed Nov. 30, 1960  2 Sheets-Sheet 1

INVENTOR.
Liam Robert Jackson
BY
John B. Sowell
ATTORNEY

Oct. 6, 1964
L. R. JACKSON
3,151,712
INSULATING STRUCTURE
Filed Nov. 30, 1960
2 Sheets-Sheet 2
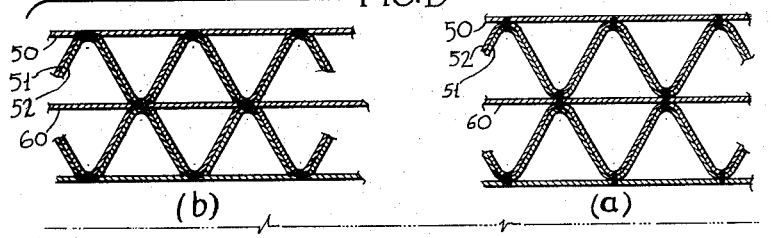
FIG.13
(b)     (a)
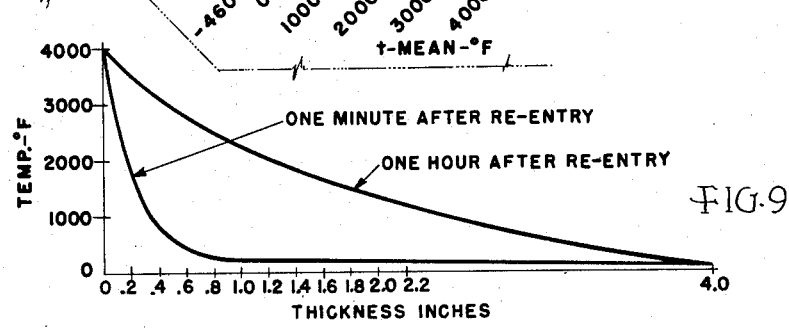
$K = \dfrac{B \text{ IN. OF THICKNESS}}{\text{hr ft}^2 \text{°F}}$
FIG.8
FIG.9
ONE MINUTE AFTER RE-ENTRY
ONE HOUR AFTER RE-ENTRY
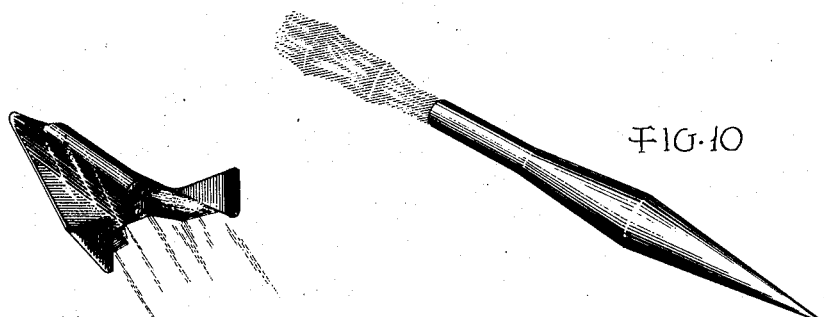
FIG.10
FIG.11
FIG.12
INVENTOR.
Liam Robert Jackson
BY
John B. Powell
ATTORNEY

United States Patent Office 3,151,712
Patented Oct. 6, 1964

3,151,712
INSULATING STRUCTURE
Liam Robert Jackson, Philadelphia, Pa., assignor to The Budd Company, Philadelphia, Pa., a corporation of Pennsylvania
Filed Nov. 30, 1960, Ser. No. 72,784
11 Claims. (Cl. 189—34)

The present invention relates to pre-fabricated metal sandwich structures and more particularly to a new type high temperature insulating structure that may be used as the monocoque structure for hypersonic vehicles.

Heretofore various metal sandwich structures have been proposed to serve as either insulating or structural members. In some embodiments a filler material has been employed to further reduce heat losses without any loss in structural strength. In these most advanced embodiments metal honeycomb structures are brazed to face sheets to form sandwich panels.

Even the most advanced present day structures are inadequate for the high temperature and high stresses imposed on an integral light weight metal structure of a hypersonic vehicle.

Brazed panels require extremely accurate machining, inert gas heating ovens, and expensive molds and press forms in order to produce a panel area of limited size. Such panel structures are incapable of operation at temperatures in excess of the brazing flux and are designed for operation considerably below 2000° F.

Hypersonic vehicles require some type of strong light structure that will maintain structural strength at temperatures above 2000° F. It would be extremely desirable to provide a universal type of insulation structure which would insulate against temperatures in the plastic deformation temperature range of high temperature metals and yet maintain structural strength while maintaining superior qualities of insulation. It would be further desirable if this structure could be fabricated cheaply without special tools and was of such a nature that it was adaptable to mass production methods. It would be further desirable, if the structural and insulation characteristics could be readily ascertained from theoretical consideration to enable fabrication of only that structure which is necessary to maintain required strength and insulation qualities. It would also be desirable if the structure could be fabricated from dis-similar metals and preserve the strength of similar metal weld connections.

It is therefore a general object of the present invention to provide a novel light insulation structure that may be completely pre-fabricated from high temperature metals to any desired configuration.

Another object of the present invention is to provide a novel panel structure that may be pre-fabricated in an integral form without restriction to size.

A further object is to provide a novel sandwich structure which provides equal resistance to bending moment in all directions.

A further object is to provide a novel sandwich structure of improved strength in compression for its weight without reducing the tensile strength represented by the metal cross-section area.

A further object is to provide a novel sandwich insulation structure which may be pre-fabricated from dis-similar high temperature metals.

A further object is to provide a novel heat radiation shield sandwich structure which reduces radiation heat losses while improving the panel strength characteristics and further provides isolated chambers for bulk storage or evacuated insulation space or both.

Another object of the present invention is the provision of a sandwich insulation structure whose layer arrangement may be varied without loss of contour accuracy.

Another object of the present invention is to provide a novel layer for a sandwich structure which may be readily mounted over either concave or convex contour forms and welded in layers to form an integral shape without special forming tools or welding mandrels.

Another object is to provide a novel insulating structure which nullifies the need for parasitic insulations and cumbersome cooling systems associated with hypersonic vehicle structures.

Structures constructed in accordance with the sandwich insulation structure invention may in general comprise a plurality of first layers which are substantially smooth having high heat reflection properties. The finished outer surfaces of said first layers being attached to a like finished plurality of intermediate layers, said intermediate layers comprising formed layers of alternately disposed raised and lowered truncated hemispherical shapes for attachment by welding to alternate first layers and adjacent intermediate layers at the truncated planes of alternate raised and lowered hemispherical shapes, and a substantially smooth second layer attached to the raised truncated hemispherical shapes of the last intermediate layer.

Other features and objects of the invention will be found throughout the more detailed description of the invention which follows. Those novel features believed descriptive of the nature of the invention are described with particularity in the appended claims. To more clearly portray the invention and its manner of operation the description is supplemented with the accompanying drawings:

FIG. 8 is a heat conductivity vs. operational temperature range for a structure similar to FIG. 1 having evacuated voids, polished interior surfaces;

FIG. 9 is a time-temperature diagram showing temperatures throughout a thickness of typical structure like that shown in FIG. 1;

FIG. 10 is an illustration of a typical powered re-entry vehicle;

FIG. 11 is an illustration of a typical glide re-entry vehicle;

FIG. 12 is an illustration of a typical ballistic re-entry vehicle with ablating insulating structure;

FIG. 13 is a section in elevation of a laminate formed of dis-similar metals and welded to similar metal intermediate layers.

Figure 1:
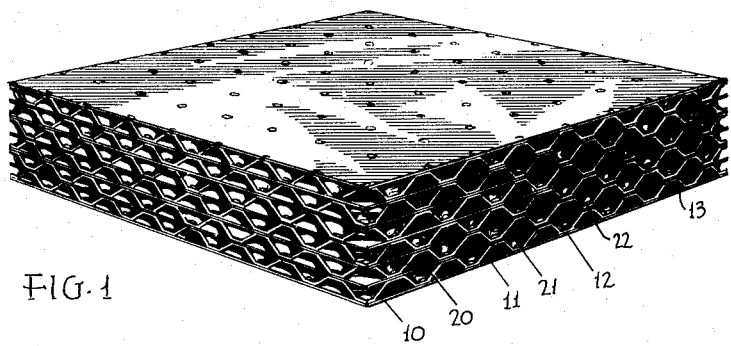
FIG. 1 is a perspective view of a preferred insulation structure sandwich.

Referring now more in detail to the several figures of the drawings, it will be seen that the metal panel in the form shown in FIG. 1 comprises a first thin flexible smooth layer 10 which may be formed over or into a pattern having a desired surface contour. For large surfaces the edge portions of the first layer may be butt welded by known techniques and finished to form a continuous smooth sheet of unlimited size. Applied contiguous the first layer 10 is a first thin flexible intermediate layer 11 which has an irregular surface comprising alternate raised and lowered shapes. The first intermediate layer 11 is attached by gas shield welds 12 to the first smooth layer 10. Layer 11 may have flat planes 13 formed at the apex of the raised and lowered shapes thus providing a flat plane which abuts the first thin flexible smooth layer 10. This plane 13 enables better welding over a controlled area by providing matching surface for homogeneous uniform welding.

The flat planes 13 also provide a flat measuring plane from which the overall thickness of the intermediate layer 11 can be easily fabricated to exact dimensions without further machining. When the weld 12 is applied through the plane 13 of the lowered shape, the layer 11 may be held contiguous layer 10 by the adjacent lowered shapes which are cold. Thus, the welding of layers together may be performed without a locating pattern or jig and without distortion of critical dimensions due to plastic flow in the molten weld. After the weld is made the shape still retains its structural characteristics.

Layer 11 is so formed that it may be cut along one of its rectangular axes to provide a straight welding edge. For large surfaces this straight edge portion may be butt welded by known methods to form a uniform layer of unlimited size. As already explained the intermediate layer 11 is attached to the first smooth layer 10 by welding at the truncated planes of the lowered shapes. Another smooth layer 20, similar to layer 10, is applied contiguous over the connected layers 10 and 11 to be attached by welding at the truncated planes of the raised shapes of layer 11.

Before welding layer 20 to layer 11 a second intermediate layer 21 is formed contiguous to layer 20. Layers 20 and 21 are gas shield welded together with layer 11 forming a rigid sandwich structure conforming to a predetermined contour. As already explained weld 22 connects three layers. It is advantageous to fabricate a smooth layer and an intermediate layer together. Not only does the intermediate layer serve as a pattern determining the exact weld position but the intermediate layer being welded may be held in contact with existing structure at cold points while the weld is applied. This enables the structure to be built up holding the exact dimensions of the sum of the layers applied. If so desired, the smooth layer 20 may be an extremely thin radiation shield which is easily welded into the sandwich by the present method.

Additional layers such as 30 and 31, 40 and 41 may be applied in the same manner as layers 20 and 21 until the sandwich is built up to the desired strength and insulation properties.

To complete the sandwich a last thin flexible smooth layer 15 is applied over the last applied intermediate layer and is attached by welds 16. Welds 16 may be blind welds, but the spacing of the symmetric pattern of the intermediate layers may be reproduced on this last smooth layer 15 to enable extremely accurate location of the welds 16.

A method which has been found to be extremely desirable is to start the fabrication with what will be the finished layer of the sandwich. Then the first thin smooth layer is contiguous the mold or pattern and the inner layers are built up to a desired inner contour. When the sandwich structure is constructed in this manner aerodynamic contours are maintained which are as accurate as the master pattern, and there is no machining required to produce the finished outside surface.

As shown in FIG. 1 the novel sandwich structure comprises two distinct layer shapes, one of which is basically smooth like layers 10, 20, 30, 40 and 15 and the other shape having alternately raised and lowered portions like layers 11, 21, 31 and 41. Both layers are preferably constructed of a thin flexible high temperature metal which enables the fabrication of the insulation structures in conformity with a predetermined contour without the necessity of special forming tools. In actual practice it was found that the requirements of hypersonic vehicles permit the use of highly flexible layers.

Structural requirements for hypersonic vehicles require that the maximum strength be attained with a minimum of structural weight. The novel preferred intermediate layers achieve the ultimate desired result in this respect.

Figure 4:
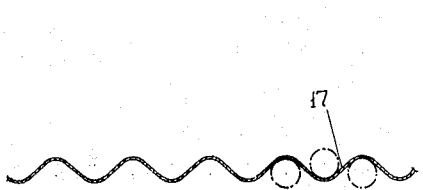
FIG. 4 is a section view taken on the line 4—4 of FIG. 3.
Figure 5:
FIG. 5 is a section view taken on the line 5—5 of FIG. 3.

In order to provide a strong, continuous structure the intermediate layer shown in FIGS. 2 to 5 is formed so that the alternate elevations and depressions conform to the geometric shape of truncated hemispheres. As shown in FIG. 4 both the apex and base of the raised and lowered hemispherical shapes are truncated although the apex need not be truncated to achieve the desired structural result. Connecting the alternate shapes is a connector portion 17 which is normal to the radii of the alternate shapes. When the intermediate layer is cut through this connector portion 17 along one of its lateral axes the connector portion appears as a straight line, as shown in FIG. 5. The base truncation of the hemispherical shape should be sufficient to allow a width of connector portion 17 which will permit a cutting device to trim the edge portion and leave a straight line connector portion to be used as a welding edge. The straight line connector portion enables the butt welding of adjoining layers into a gas tight seal which may not be feasible along an irregular surface. This connector portion is located midway between the raised and lowered shapes which permits welding without finishing when the structural sandwich is of unlimited size. Further the connector portion permits the use of identical intermediate layers on successive decks of a sandwich structure for the connector portion is sufficient to permit staggering of layers and the adjustment of differential circumferential lengths. The several layers are preferably welded at staggered points to provide greater structural strength through the section should the weld anneal a cold-worked metal.

Figure 7:
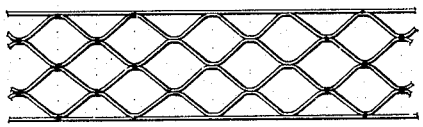
FIG. 7 is a section view similar to FIG. 6 with the heat radiation shields removed.
Figure 6:
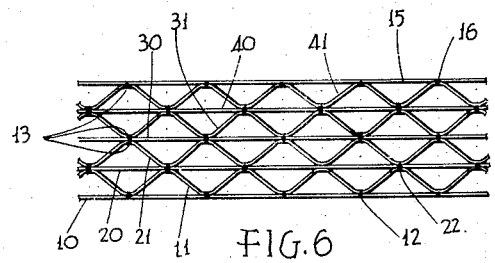
FIG. 6 is a section view of a preferred insulation structure shown in FIG. 1.
Figure 3:
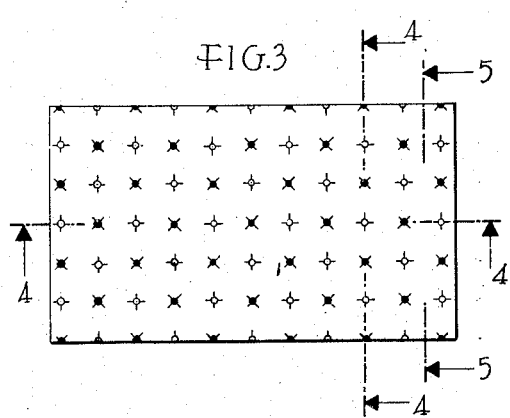
FIG. 3 is a plan view of one of a preferred type intermediate layers showing the rectangular orientation of the alternately raised and lowered truncated hemispherical shapes.

In order to provide a strong light structure the intermediate layers shown in FIG. 7 are welded together to form a lattice of structural trusses. It is known in the art that a truss arrangement offers a maximum resistance to bending moment and the novel symmetrical arrangement of the hemispherical shape provides resistance to bending moment which is also symmetric. Such a beneficial effect has not been achieved by non-symmetric layers, nor is this desirable result achieved by honeycomb or corrugation sandwich structure layers.

Figure 2:
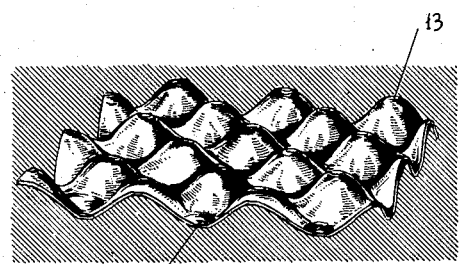
FIG. 2 is a perspective view of one of a preferred type intermediate layers showing the alternately raised and lowered truncated hemispherical shapes.

When tensile stress is applied to attempt to elongate the novel layer shown in FIG. 2 there are no sharp corners or continuous bends which can unfold and the layer reacts the same as a continuous smooth layer in tension. In compression along its length the composite truss structure resists bending moment as a built up column or truss. This feature results from the fact that stresses acting in the plane of the novel layer are transferred in hoop stresses in the hemispherical shapes and do not act to unfold or compress corrugation type folds found in sharp edge sandwich structures.

It is known that a spherical or hemispherical shape is the most rigid geometric shape for a given weight of material. The novel intermediate layer offers a resistance to crushing similar to a layer supported by hemispheres. There are no vertical planes to distort in bending moment such as those found in honeycombs or corrugations, nor are there any horizontal planes between supporting shapes which would not operate to resist crushing. The apex truncations of the hemispherical shapes form part of the weld and tend to distribute the crushing load on the layer, avoiding stress concentrations that reduce the resistance to crushing. When the composite sandwich structure is welded together the lattice of trusses distributes any concentrated crushing load over a large area. The novel intermediate layer when welded into the sandwich will have neither horizontal nor vertical surfaces. The novel layer is extremely flexible in design for the resistance to crushing may be increased by increasing the thickness of the metal forming the intermediate layer or alternatively the size of the hemispherical shapes may be decreased which results in a greater number of supporting hemispheres. Usually the size of hemispheres and thickness of layers are determined by the requirements imposed by design stress condition and the desirability of the lighter structure.

Heat insulation requirements for hypersonic vehicles require that a maximum strength be attained at maximum temperature. It is known in the art that the elastic strength constants of metals are generally reduced by elevated temperatures. In order to provide a strong light structure that is capable of withstanding stresses at the operational stress ranges of high temperature metals there is provided a novel composite insulation structure which is fabricated from high temperature metal layers by rodless fusion welding. Inert gas welding is a preferred method for it prevents oxidation of the metals at the weld areas.

In order to provide an improved heat insulation structure the surfaces of the layers of the structure may be highly polished or plated with a very thin surface of low emissivity. When the layers are to be plated the weld points are preferably not plated to avoid any contamination or weakening of the weld structure. In addition to the intermediate layers like 11, 21, 31 and 41 there are provided heat radiation shields like 20, 30 and 40 which may be of very thin metal. The radiation shields also provide separable compartments that may be evacuated, leaving a void space, further reducing heat transmission through the structure. Evacuated compartments may also be used to temporarily store fluids for special applications of the insulation structure.

Preferably the plane radiation shields are plated thicker than the intermediate layers with a low emissive high heat conductive plating to allow heat conducted through the weld points to conduct laterally in the heat radiation shields thus eliminating internal and external hot spots.

At very high temperatures the representative thermal conductivity (K) of an insulating body or an insulation structure changes throughout the thickness of the insulation.

The heat conductivity (K) in B.t.u.'s (British thermal units) per hour—(foot)²—degree Fahrenheit per inch of thickness is shown in FIG. 8 for a typical structure like that shown in FIG. 1. It will be noted that the heat conductivity (K) increases appreciably with increasing temperature. Due largely to this change of heat conductivity the insulation structure offers a unique time temperature gradient. As shown in FIG. 9 a typical insulation structure like that shown in FIG. 1 could be exposed to 4000° F. temperature for one minute at the outer surface and be at room temperature at any inner surface for an insulation structure thickness greater than .7 inch. In the alternative, a typical structure could maintain normal room temperature on the inner surface after one hour of exposure to 4000° F. Since metals such as tungsten are capable of temperatures up to 6000° an insulation structure may be fabricated to withstand such a condition. In practical applications there is no requirement that all the layers of the insulation structure be constructed of a metal which would withstand 6000° F. conditions. Tantalum-tungsten alloy may be used for temperature ranges of 3000°–5000° F., Columbium alloy may be used for temperature ranges of 2000°–3500° F., cobalt base alloys may be used at 1000°–2000° F. Iron and/or nickel base stainless steel alloys may be used at 0°–1200° F., and titanium may be used at temperature ranges of −420° F. to 250° F. The metal herein suggested are not exclusive, but are representative of metals used in high temperature applications.

The novel insulation structure may be fabricated in such a manner that the intermediate layers like 11, 21, 31 and 41 are of dis-similar metals.

In order to provide a light economical heat insulation structure having dis-similar metal intermediate layers, two dis-similar metal layers are formed together as a laminate as shown in FIGS. 13a and 13b. These layers are preferably of the clad-metal type formed together to make one intermediate layer. By way of example, outer layer 50 may be tungsten; a first surface 51 of the intermediate layer may be some metal other than tungsten; the other surface 52 of the intermediate layer is also tungsten while the smooth layer 60 is of the same metal as layer 51. The apex of the shapes are preferably ground down through one layer of the double intermediate layer exposing the dis-similar metal as shown in FIG. 13b. This unique modification of the intermediate layer structure allows an insulation structure to be fabricated of dis-similar metals by welding of similar metals, thus eliminating a problem long standing in the art; i.e. the welding of dis-similar metals.

The apparent thermal conductivity of the improved sandwich layer can be explained by examination of the following equation:

$$K = F_1(K_g) + F_2 L K_m \frac{(A_m)}{(X)} + F_3 L \frac{(h_r)}{(n)}$$

$F_1$, $F_2$ and $F_3$ = Combined factors
$L$ = Total thickness of insulation structure
$K_g$ = Conductivity of gas
$K_m$ = Conductivity of metal
$A_m$ = Percent of through metal area
$X$ = Length of metal heat conduction path
$h_r$ = Radiation coefficient
$n$ = Number of effective radiation shields There are only three components included in the thermal conductivity equation. The internal free convection component ordinarily considered in a thermal conductivity equation has been eliminated by maintaining a distance between plane sheets of less than .25 inch; i.e. the height of an intermediate layer measured from the lower hemispherical shapes to the higher hemispherical shapes.

The first component of the equation $F_1(K_g)$ consists of conduction of the gas in the voids of the sandwich layers; the second component of the equation $$F_2 L K_m \frac{(A_m)}{(X)}$$

consists of the conductivity of the through-metal area and the third component $$F_3 L \frac{(h_r)}{(n)}$$

consists of internal radiation. It will be noted that the apparent thermal conductivity (K) can be reduced when the $K_g$ constant of the first component is zero. This is accomplished by evacuating the voids, thus, effectively canceling out the conductivity component of the gas.

The percent through metal area $A_m$ of the second component may be reduced by designing the intermediate layer to have the least number of hemispherical shapes per unit area which also increases the heat path conduction length (X).

The third component of the thermal conductivity equation is the internal radiation component. This component is directly proportional to the radiation coefficient $(h_r)$ which is proportional to the emissivity of all the internal surfaces. This third component is reduced by low emissive plating and inclusion of a large number of shields (n) per inch of thickness.

Employing a preferred type intermediate layer whose total height was .183 inch and whose metal thickness was .010 inch the through metal conductivity area is less than ½ of 1% at 4 weld points per square inch. The total heat transmission represented by the through metal component for such a structure still accounts for approximately 20% of the total heat transmission when the mean internal temperature of the sandich structure is at 2000° F. even though this type sandwich structure has the minimum possible through metal area at the weld points. If the mean temperature increases, the heat transmission due to through metal area becomes a decreasing percentage of the total heat transmission as radiation becomes the dominating factor. A structure built up of intermediate layers having a total height of .183 inch each with polished internal surfaces and evacuated voids at 2000° F. mean temperature has an apparent thermal conductivity of $$K = \frac{.80 \text{ B.t.u.} - \text{in}}{\text{hr. ft.}^2 \text{ ° F.}}$$

At this temperature fibrous insulations would have a K equal to approximately 3.0, refractories would have a K equal to approximately 3.2 and brazed structures are inoperative.

The insulation structure has been examined considering a preferred application wherein there are no insulation fillers or inert gases in the voids. In some applications it may be necessary to employ inert gases in the voids in preference to a vacuum to avoid oxidation of the low emissivity surfaces although this is a compromise predicated by high temperature applications. As already explained the total thermal conductivity of the insulation structure at temperatures greater than 1000° F. consists largely of the internal radiation factor. To avoid hot spots caused by localized heating the lateral conductivity of the insulating structure may be increased. The lateral conductivity of typical metals is in excess of 600 times its transverse conductivity and can be further increased by the insertion of light weight pyrolytic graphite between the hot outer skin and the first or second intermediate layer. Thus, an increase in the heat transfer area normal to the direction of conduction may be accomplished by using a material of less weight than the thermal outer skin. Pyrolytic graphite is a preferred filler in that it has a high ratio of lateral conductivity to transverse conductivity. When such applications for the outer skin approach 6000° F. the pyrolytic graphite in the void is protected from oxidation and maintains its high compressive strength.

Thermal protective structures are of two general catagories; (1) Absorptive systems and (2) Radiative systems. The novel insulation structure may be employed in either or both environments. For example, FIG. 10 illustrates the outline of a powered re-entry vehicle which would usually require the highest possible temperature resistance for a short time period. A radiative-absorptive system having an outside skin of high ablation temperature metal with pyrolytic graphite backing in an evacuated void sandwich layer of dis-similar metals would meet the majority of these requirements.

FIG. 11 illustrates a glide re-entry vehicle which may be exposed to high temperature conditions for a long time period. The outer skin of the radiative system would not usually require a backing and only one or two outside layers need be of dis-similar metals for the temperature gradient drops rapidly through the insulation structure.

FIG. 12 illustrates a blunt nose ballistic re-entry vehicle which would produce temperatures in excess of any known metals for short time periods. An absorptive system of high temperature layers which would ablate leaving only the minimum required insulation structure would meet most of these requirements.

It is to be understood that various modifications and changes may be made in the arrangement of the novel layers. Other insulations or structures although usually less effective may be used in combination with the novel insulation structure without departing from the scope of my invention, some of the novel features of which are defined in the appended claims.

What is claimed is:
1. A structural core sheet for sandwich panels comprising,
a core sheet,
embossments in said imperforate core sheet,
said embossments being arranged in a pattern of rectangular coordinates,
said embossments in said pattern being alternately disposed raised and lowered hemispherical shapes,
nodes on said raised and said lowered shapes formed as compound curvature bodies of revolution having rounded ends,
an imaginary neutral plane symmetrically located in said core sheet halfway between the ends of said nodes of said raised and lowered shapes,
an upper concave saddle portion connecting adjacent nodes on adjacent raised shapes,
a lower concave saddle portion connecting adjacent nodes on adjacent lowered shapes,
and a diagonal portion connecting alternately disposed nodes on alternately disposed raised and lowered shapes,
said portions connecting said nodes being formed as compound curvature shapes projecting from said imaginary neutral plane,
said portions connecting said nodes being interconnected with said nodes and each other to form a continuous compound curvature pattern in said core sheet characterized by the absence of flat plane areas in said pattern and in said imaginary neutral plane.

2. A structural core sheet for sandwich panels comprising,
an imperforate core sheet;
a formed pattern in said core sheet;
said pattern being arranged in a rectangular coordinate array;
said pattern consisting of a plurality of raised and lowered base truncated hemispherical nodes;
said raised and lowered nodes being alternately disposed from each other in said rectangular coordinate array;
a neutral plane in said pattern located halfway between said raised and lowered nodes;
a compound curvature upper saddle portion connecting adjacent raised nodes, said upper saddle portion having its lowermost point located in said neutral plane;
a compound curvature lower saddle portion connecting adjacent lowered nodes, said lower saddle portion having its uppermost point located in said neutral plane;
and a compound curvature tangential portion connecting the bases of said base truncated alternately disposed nodes, said tangential portion being symmetric to said neutral plane and having its center point located in said neutral plane;
said compound curvature portions being interconnected with each other and with said nodes to form a continuous compound curvature pattern having points in said portions intermediate said nodes located in said neutral plane.

3. For use in a sandwich panel,
an imperforate core sheet comprising a plurality of embossments arranged in a regular coordinate system comprising,
first and second series of embossments,
said first series having a plurality of concave spherical shaped nodes arranged on said regular coordinates,
a plurality of saddle portions interconnecting adjacent concave nodes along the coordinates,
said second series of embossments having a plurality of convex spherical shaped nodes arranged on said coordinates,
a plurality of saddle portions interconnecting adjacent nodes of said second series along their coordinates, each node of each series being connected by a diagonal compound curved portion tangent to each adjacent node of the other series, said portions being connected to each other and to said nodes to form a continuous compound curvature core sheet.

4. A core structure for use in a sandwich panel, a core sheet comprising;

a pattern of embossments arranged in a rectangular coordinate pattern symmetrical to the neutral plane of said core sheet;

said pattern comprising a plurality of alternately disposed raised and lowered compound curvature nodes having rounded ends and formed as base truncated bodies of revolution, an upper compound curvature saddle portion connecting adjacent raised nodes, a lower compound curvature saddle portion connecting adjacent lowered nodes, and an intermediate compound curvature tangential portion connecting tangential extensions of the truncated bases of said raised and lowered nodes, said portions being interconnected with each other and with said nodes to form a continuous imperforate compound curvature pattern in said core sheet.

5. A sandwich structure comprising, a plurality of core sheets as set forth in claim 4, a plurality of continuous imperforate smooth skin layers, a lower deck comprising one of said skin layers welded to one of said core sheets at the ends of said lower nodes, an intermediate deck comprising one or more of said core sheets, said intermediate deck being welded to said lower deck by welding the ends of the lowered node of said intermediate deck to the raised nodes of the next lower core sheet, and an upper deck comprising one of said skin layers welded to one of said core sheets at the ends of said raised nodes, said upper deck being welded to said intermediate deck by welding the ends of the lowered nodes of said upper deck to the ends of the raised nodes of said intermediate deck, said decks being welded to each other by fusing the metal of the decks in a blind weld to provide homogeneous weld metal connection between decks.

6. An insulation structure as set forth in claim 5 which further includes a plurality of smooth layers interposed between said decks and welded integrally therewith, said interposed smooth layers being provided with a high radiant heat emissive surface.

7. A sandwich structure comprising;

a lower skin sheet having a smooth imperforate surface;

and a core sheet having a plurality of embossed nodes in a rectangular coordinate system comprising, first and second series of nodes, said nodes of said first series having concave spherical shapes centered on said coordinates and saddle portions interconnecting adjacent concave shapes along said coordinates, said second series of nodes having convex spherical shapes centered on said coordinates and saddle portions interconnecting adjacent convex shapes along said coordinates, each node of each series being connected to adjacent nodes by a diagonal compound curvature portion, said nodes and said portion providing a continuous compound curvature core sheet, fusion welds connecting said first series of concave shaped nodes to said lower skin sheet, a plurality of similarly formed core sheets connected by fusion welds at their first series of nodes to the next lower core sheet by its second series of convex shaped nodes, and an upper skin sheet attached to the uppermost of said plurality of similarly formed core sheets at the convex shaped nodes thereof by fusion welds to form a built-up sandwich structure.

8. A sandwich structure as set forth in claim 7 wherein at least one of said core sheets is formed as a laminate of two dissimilar metals, the ends of the nodes of said first and said second series being removed to provide a single thickness of metal at the nodes of the laminate, said single thickness of metal at said first series being one of said dissimilar metals and said single thickness at said second series being the other of said dissimilar metals, said core sheet formed as a laminate being connected in said sandwich structure by fusion welds between two of said sheets of said sandwich structure, the upper of said sheets being of one of said dissimilar metals and the lower of said sheets being of the other of said dissimilar metals, whereby the welds connecting said laminate core sheet are connected as similar metals with homogeneous fusion welds.

9. A laminate core welded sandwich panel comprising, an upper skin sheet of a first type metal having a smooth surface;

a laminate core sheet having an upper layer of a second type metal and a lower layer of said first type metal, said laminate core sheet having a plurality of embossed nodes arranged in a rectangular coordinate pattern, said pattern comprising a plurality of raised nodes and a plurality of lowered nodes, said nodes being formed as compound curvature bodies of revolution with rounded ends, compound curvature connecting portions interconnecting said plurality of raised nodes to said plurality of lowered nodes, said nodes and said portions providing a continuous imperforate compound curvature core sheet;

apertures in said second type of said upper layer of said laminate core sheet metal at the ends of said raised nodes and providing a single thickness of said first type metal at said raised nodes;

apertures in said first type metal of said lower layer of said laminate core sheet at the ends of said lowered nodes providing a single thickness of said second type metal at said lowered nodes;

a lower skin sheet of a second type metal;

and fusion welds connecting said single thickness of said first type metal at said raised nodes to said upper skin sheet of said first type metal, and connecting said single thickness of said second type metal at said lowered nodes to said lower skin sheet of said second type metal whereby a sandwich panel of dissimilar type metal layers is welded together at joints of similar type metals.

10. A laminate core welded sandwich structure as set forth in claim 9 wherein said compound curvature bodies of revolution are base truncated hemispherical nodes and said nodes in said rectangular coordinate pattern are alternately disposed from each other a distance substantially equal to the diameter of the hemispheres forming the base truncated hemispherical nodes.

11. A laminate core welded sandwich panel comprising;

an upper skin sheet of a first type metal;

a laminate core sheet having embossed thereon a rectangular coordinate array of alternately disposed raised and lowered compound curvature bodies of revolution formed as base truncated nodes interconnected by compound curvature interconnecting portions, said laminate core sheet comprising an upper layer of a second type metal and a lower layer of said first type metal;

apertures in said second type metal of said upper layer of said laminate core sheet at the ends of said raised nodes providing a single thickness of said first type metal at said raised nodes;

apertures in said first type metal of said lower layer of said laminate core sheet at the ends of said lowered nodes providing a single thickness of said second type metal at said lowered nodes;

a lower skin sheet of a second type metal;

weld nuggets formed from the first type metal in said sheets, said weld nuggets connecting said single thickness of said first type metal at said raised nodes to said upper skin sheet of said first type metal;

and weld nuggets formed from the second type metal in said sheets, said weld nuggets connecting said single thickness of said second type metal at said lowered nodes to said lower skin sheet of said second type metal whereby a sandwich panel of dissimilar type metals is welded together by weld nuggets formed from similar type metals.

References Cited in the file of this patent

UNITED STATES PATENTS

| | | |
|---|---|---|
| 2,481,046 | Scurlock | Sept. 6, 1949 |
| 2,926,761 | Herbert | Mar. 1, 1960 |
| 2,995,222 | Bowman | Aug. 8, 1961 |
| 3,013,641 | Compton | Dec. 19, 1961 |

FOREIGN PATENTS

| | | |
|---|---|---|
| 497,646 | Italy | Dec. 16, 1954 |
| 783,184 | Great Britain | Sept. 18, 1957 |
| 797,208 | Great Britain | June 25, 1958 |
| 991,704 | France | June 27, 1951 |

OTHER REFERENCES

Steel: May 24, 1948, pp. 94–97, 119 and 120.